US012674350B1

(12) United States Patent
Li

(10) Patent No.: US 12,674,350 B1
(45) Date of Patent: Jul. 7, 2026

(54) GATE STRUCTURE

(71) Applicants: Xin-Yi Li, Kaiping City (CN); Ying-Yang Li, Kaohsiung City (TW); Shu-Yi Li, Kaohsiung City (TW); Zhen-Feng Li, Kaiping City (CN)

(72) Inventor: Xin-Yi Li, Kaiping City (CN)

(73) Assignees: Xin-Yi Li, Kaiping City (CN); Ying-Yang Li, Kaohsiung City (TW); Shu-Yi Li, Kaohsiung City (TW); Zhen-Feng Li, Kaiping City (CN)

( * ) Notice: Subject to any disclaimer, the term of this patent is extended or adjusted under 35 U.S.C. 154(b) by 0 days.

(21) Appl. No.: 19/069,635

(22) Filed: Mar. 4, 2025

(51) Int. Cl.

| | |
|---|---|
| ***E05F 15/684*** | (2015.01) |
| ***E06B 5/00*** | (2006.01) |
| ***E06B 9/06*** | (2006.01) |

(52) U.S. Cl.
CPC ............ *E05F 15/684* (2015.01); *E06B 5/003* (2013.01); *E06B 9/0653* (2013.01); *E06B 9/0676* (2013.01)

(58) Field of Classification Search
CPC ................. E06B 9/0676; E06B 9/0653; E06B 2009/007; E04H 9/145; E05F 15/684
USPC ........................................................... 49/126
See application file for complete search history.

(56) References Cited

U.S. PATENT DOCUMENTS

| | | | | |
|---|---|---|---|---|
| 6,279,640 | B1 * | 8/2001 | Van Lennep | E06B 9/0676 160/32 |
| 10,309,151 | B2 * | 6/2019 | Tseng | E05D 15/56 |
| 2009/0183842 | A1 * | 7/2009 | DeCola | E06B 3/485 160/209 |
| 2011/0123271 | A1 | 5/2011 | Walthall | |
| 2012/0005960 | A1 | 1/2012 | Tseng | |
| 2017/0138118 | A1 * | 5/2017 | Wong | A62C 2/18 |

FOREIGN PATENT DOCUMENTS

| | | |
|---|---|---|
| CN | 104250964 A | 12/2014 |

* cited by examiner

*Primary Examiner* — Marcus Menezes
(74) *Attorney, Agent, or Firm* — Rosenberg, Klein & Lee

(57) ABSTRACT

An improved gate structure includes at least two spaced-apart frame bodies, gate panels, a storing portion defining a storage space, and at least one driving portion. At an entrance and exit of a building is disposed the storing portion adjacent to the frame bodies. The driving portion includes a driving assembly, at least two conveyor units installed in the storage space and in the frame bodies, and at least two clamping assemblies each disposed on one side of each conveyor unit. The clamping assemblies and the conveyor units are triggered by the driving assembly, thereby clamping the gate panels and conveying the gate panels to an accommodation space defined between the frame bodies or to the storage space. The use of the improved gate structure stacks and stores the gate panels quickly because of the clamping force and the conveying operation, thereby attaining a convenient use.

18 Claims, 8 Drawing Sheets

GATE STRUCTURE

BACKGROUND OF THE INVENTION

1. Field of the Invention

This invention relates to a gate structure and relates particularly to an improved gate structure adapted to shut out the flow of water.

2. Description of the Related Art

The primary object of a gate structure is to prevent floods. Particularly, extreme weather events, such as typhoons, rainy seasons, and rainstorms, may break household facilities of the buildings because the buildings situated in low-lying areas or flood-prone areas are easily flooded or inundated. The use of the gate structure plays a prominent role to prevent heavy rains or the storm surge. It is common that the gate structure is put at an entrance and exit of a building, such as a gate where people go in and go out and a parking lot where vehicles go in and go out. Generally, the gate structure includes at least two spaced-apart frames installed at the entrance and exit and a plurality of gate boards capable of being inserted between the frames. Take for example two frames mounted at an entrance and exit of a house. To use the gate structure, the use of force by a person or persons is required. The user needs to move multiple gate boards to the entrance and exit with physical strength of user's hands and then inserts two end sections of each gate board into respective tracks of the two frames to make sure that the gate board is placed in position. After the user stacks a number of gate boards between the frames, the entrance and exit is closed. This helps shut out the water. If there is no need to use the gate structure, the user needs to separate the gate boards from the tracks by hands to open the entrance and exit and then looks for a storage area capable of accommodating these gate boards.

However, the conventional mode is a long and laborious task because of a lot of effort for moving the gate boards and inserting the gate boards into the tracks in the state of undergoing the weight of each gate board. In addition, the gate boards occupy the ground space, which may interrupt the traffic flow of the user. It is also possible to store the gate boards in different areas, and the user may take a lot of time to find exact areas where the gate boards are stored. The above situations, however, incur the inconvenience of using the conventional gate structure. Furthermore, the gate structure should be well installed prior to the occurrence of the floods. However, it is impossible to always predict the climate change, and heavy rains sometimes come without warning. In this case, there may not be enough time to stack the gate boards. Alternatively, although the user is hardly capable of executing the conventional mode, the gate boards may not be densely stacked or piled up. This situation is still difficult to prevent the invasion of heavy rains. Therefore, the conventional gate structure still needs to be improved.

SUMMARY OF THE INVENTION

An object of this invention is to provide an improved gate structure directly disposed at an entrance and exit of a building and used without moving and installing gate panels by hands. The use of the improved gate structure attains the quick movement of gate panels for saving effort and time and also allows the gate panels to be stably stacked and stored for ease of use.

An improved gate structure of this invention is as defined in claim 1. The improved gate structure includes at least two frame bodies, a plurality of gate panels, a storing portion, and a driving portion. The frame bodies and the storing portion are disposed at the entrance and exit. The gate panels are adapted to be installed between the frame bodies. An accommodation space is defined between the frame bodies. An interior of the storing portion forms a storage space. The driving portion is configured to move the gate panels. The storing portion is adjacent to or adjacently connected to the frame bodies and also extended in a first direction for storing the gate panels. The driving portion includes at least two conveyor units, a driving assembly, and at least two clamping assemblies. Each conveyor unit is disposed in the storage space and the channel of each frame body. Each conveyor unit is disposed around the driving assembly so that a conveying operation of the conveyor units is carried out by operating the driving assembly. Each clamping assembly is mainly connected to one side of each conveyor unit and situated at a corresponding one of at least two track regions. Each clamping assembly includes a clamping portion. An outward jutting operation is performed by sticking out the clamping portion. The outward jutting operation is triggered by the driving assembly. When respective clamping portions stick out under the control of the driving assembly, each gate panel is clamped by the clamping assemblies. The clamping assemblies are moved while executing the conveying operation of the conveyor units, thus conveying the clamped gate panel from the storage space to the accommodation space or from the accommodation space to the storage space. The conveyance of the gate panels to the accommodation space allows the gate panels to be sequentially stacked in the accommodation space for closing the entrance and exit. The conveyance of the gate panels to the storage space allows the gate panels to be sequentially stored and positioned in the storage space for opening the entrance and exit.

Accordingly, an improved gate structure is obtained when the storing portion and the driving portion cooperate with the frame bodies and the gate panels. This improved gate structure is directly installed at the entrance and exit of the building. After the installation, the clamping assemblies and the conveyor units are driven to work under the control of the driving assembly, which causes the clamping portions to prop against the gate panel for attaining a stable clamping effect and also causes the conveying operation of the conveyor units to act along with the movement of the clamping assemblies. As a result of the movement of the clamping assemblies, each clamped gate panel is moved to the storage space or to the accommodation space to meet the demand of the user. In the situation of the need for the gate panels, the gate panels are directly driven to execute a stacking operation, and thus the mode of moving and installing the gate panels by physical strength of user's body is prevented. After stacking the gate panels, a stacked state is obtained, and the entrance and exit is closed in the stacked state. If the gate panels are not needed, a separating operation can be conducted. The separation between the gate panels terminates the stacked state to open the entrance and exit. Accordingly, the gate panels are stably and quickly piled up or stored, thereby saving time and effort and attaining the ease of use. Unlike the convention mode, the use of the improved gate structure does not need to look for ground areas that serve to store gate panels. Thus, the gate structure is more convenient to use.

BRIEF DESCRIPTION OF THE DRAWINGS

FIG. 1-1 and FIG. 1-2 are enlarged views showing the encircled part 1-1 and the encircled part 1-2 of FIG. 1 respectively;

FIG. 2 is a top plan view showing the partial structure of the first preferred embodiment in cross-section taken along A-A line of FIG. 1 to illustrate that the clamping portion is in a non-clamping state whereby the clamping portion does not touch the gate panel;

DETAILED DESCRIPTION OF THE PREFERRED EMBODIMENTS

Figure 1:
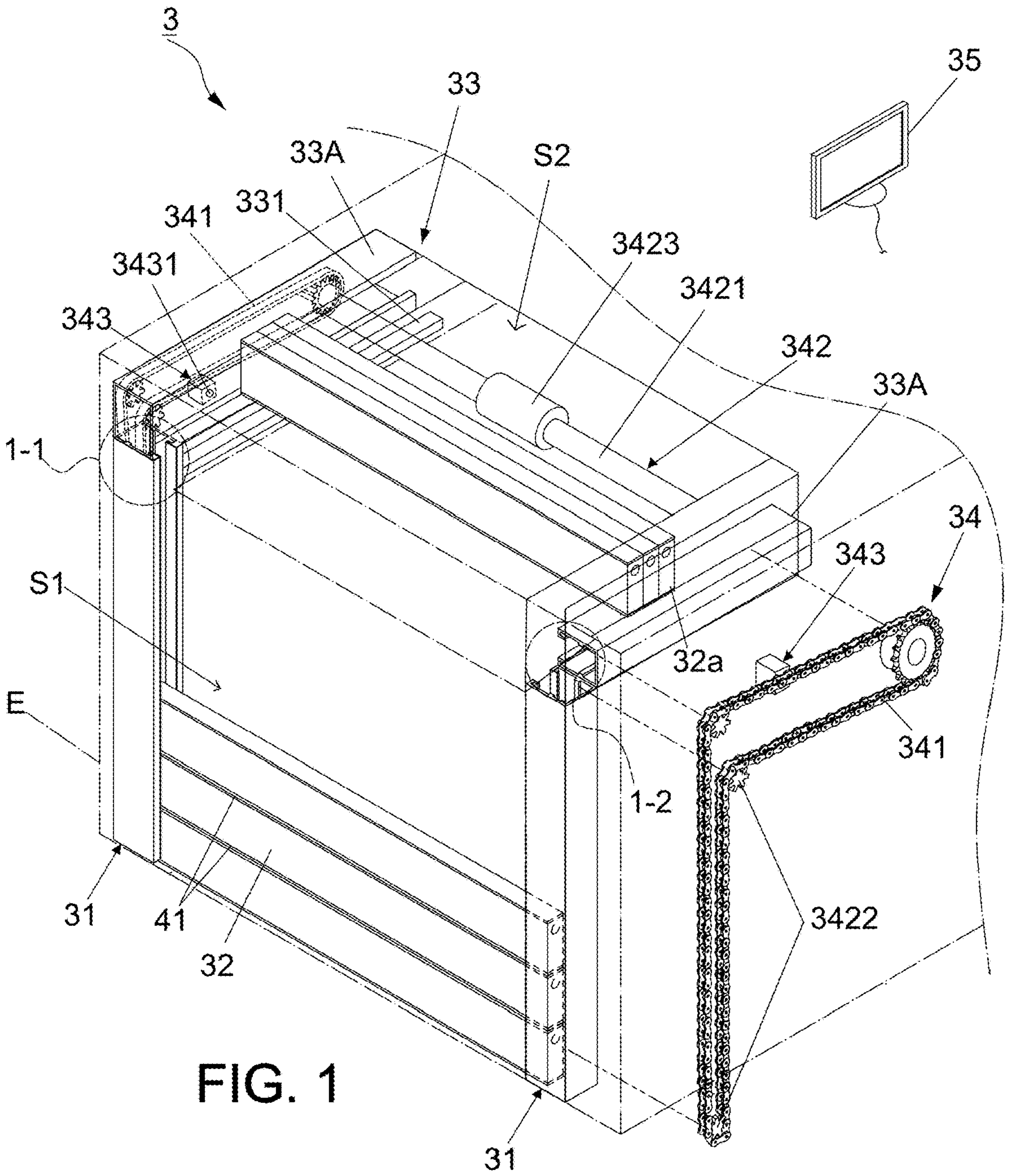
FIG. 1 is a perspective view showing a first preferred embodiment of this invention.
Figure 1:
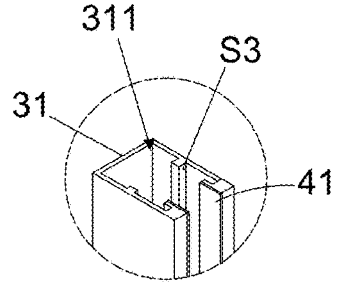

Referring to FIG. 1, a first preferred embodiment of an improved gate structure 3 is shown. The improved gate structure 3 is installed at an entrance and exit E of a building, such as a gate people go in and go out and a parking lot where vehicles go in and go out. The improved gate structure 3 includes at least two frame bodies 31 disposed at the entrance and exit E, a plurality of gate panels 32 adapted to be mounted between the frame bodies 31, a storing portion 33 provided with an internal storage space S2, and at least one driving portion 34 configured to move the gate panels 32. There can be two or more than two frame bodies 31. The number of the frame bodies 31 is adjustable to meet the size of the entrance and exit E, and take for example two frame bodies 31 shown in the figures. The frame body 31 can have various shapes, such as the shape shown in FIG. 1 and the shape shown in FIG. 1*a*. The following preferred embodiments are illustrated on the basis of the structure shown by FIG. 1. The frame bodies 31 are spaced apart from each other, so an accommodation space S1 is defined between the frame bodies 31. Each frame body 31 forms a channel 311 therein. Two end sections 32*a* of each gate panel 32 are adapted to be inserted into respective channels 311 of the frame bodies 31. Therefore, the gate panel 32 is stably placed between the frame bodies 31 while inserting the respective end sections 32*a* into the respective channels 311. The insertions of the end sections 32*a* of the multiple gate panels 32 into the respective channels 311 allow the gate panels 32 to be sequentially stacked, that is, piled on top of each other in the accommodation space S1.

To attain a dense and close stacking effect between the gate panels 321, there can be a plurality of strip units 41 adapted to come into contact with the gate panel 32. For example, the strip units 41 are disposed on the gate panel 32, especially attached to a top surface and a bottom surface of each gate panel 32 (shown in FIG. 1). The strip units 41 can also be attached to each frame body 31, especially located in the channel 311 (shown in FIG. 1-1). The strip unit 41 can be made of rubber, plastic, etc. When the gate panels 32 are put in the accommodation space S1, the strip units 41 each touch the outer surfaces of each gate panel 32 snugly in order to shut out the flow of water efficiently.

The storing portion 33 is installed at the entrance and exit E. The storing portion 33 is adjacent to the frame bodies 31. In the first preferred embodiment, it is shown that the storing portion 33 adjoins the frame bodies 31. That is, the storing portion 33 can be connected to the top portion of the frame bodies 31 so that the storing portion 33 is situated above the frame bodies 31. This arrangement not only allows the storage space S2 to communicate with the accommodation space S1 but also prevents the storing portion 31 from occupying the ground area, which facilitates the storage of the gate panels 32. In addition to the arrangement shown by FIG. 1*a*, FIG. 1 shows a possible configuration. In FIG. 1, the storing portion 33 includes at least two frame bases 33A spaced apart from each other and disposed in the storage space S2. Each frame base 33A is adjacent to each frame body 31 to allow the location of the frame base 33A to be corresponding to the location of the frame body 31, and each frame base 33A defines a passage S4 (shown in FIG. 1-2). The frame base 33A and the frame body 31 can be integrally formed. Alternatively, the frame base 33A is joined to the frame body 31. Each conveyor unit 341 is mounted in each passage S4, and each track region S3 is also formed in each passage S4. The conveyor unit 341 and the track region S3 will be described in following paragraphs. For the sake of conciseness, the frame base 33A, the conveyor unit 341, and the track region S3 are briefly shown in the figures. Furthermore, the interior of the storing portion 33 includes a plurality of walls (briefly shown), and the storage space S2 is enclosed by the walls. The storing portion 33 is extended in a first direction, and the first direction is varied according to the arrangement of the building. For example, the first direction is directed from the entrance and exit E towards the interior of the building (shown in FIG. 1) or towards the outside of the building (not shown). It is also possible that the extension of the storing portion 33 has a slope to prevent the gate panels 32 from slipping out of the storage space S2. The dimension of the storage space S2 depends on the number of the gate panels 32, and thus there is enough space to store all gate panels 32 in the storage space S2.

At least two guidance seats 331 can be disposed in the interior of the storing portion 33, namely in the storage space S2. For the sake of conciseness, one guidance seat 331 on one side is briefly illustrated in the figures. Each guidance seat 331 is directed at each frame body 31. That is, the location of the guidance seat 331 corresponds to the location of the frame body 31, and this condition allows the number of the guidance seats 331 to be equal to the number of the frame bodies 31 and the number of the conveyor units 341. The guidance seat 331 serves to support the gate panels 32 which are moved under the conveying operation of the conveyor units 341.

The driving portion 34 serves to move the gate panels 32. To attain the movement of the gate panels 32 (upward movement and downward movement) through an automatic control means or a remote control means, a control portion 35 is connected to the driving portion 34 in the first preferred embodiment. For example, a control portion 35 can be electrically connected to the driving portion 34, so the operation of the driving portion 34 is controlled by the control portion 35. The control portion 35 can be, but not limited to, a remote monitor, an application, a wired remote controller, a wireless remote controller, etc. The user emits a command signal through the control portion 35 to operate the driving portion 34 or stop the driving portion 34, which attains the remote-controlled function for automation and even functions as a burglar-monitoring device. Herein, take the remote monitor as an example in the first preferred embodiment.

The driving portion 34 includes at least two conveyor units 341, a driving assembly 342, and at least two clamping assemblies 343. The conveyor units 341 serve to move the gate panels 32 via a conveying operation. The conveyor units 341 are respectively disposed in the storage space S2, especially in respective passages S4 located in the storage space S2, and also disposed in respective channels 311 of the frame bodies 31. Thus, each conveyor unit 341 can be extended from the storage space S2 to each channel 311. The conveyor unit 341 is a conveyor chain, a conveyor belt, or a conveyor belt in combination with a conveyor chain. Herein, the conveyor chain is taken as an example in the figures, and for the sake of conciseness, one conveyor unit 341 on one side is briefly illustrated.

Figure 5:
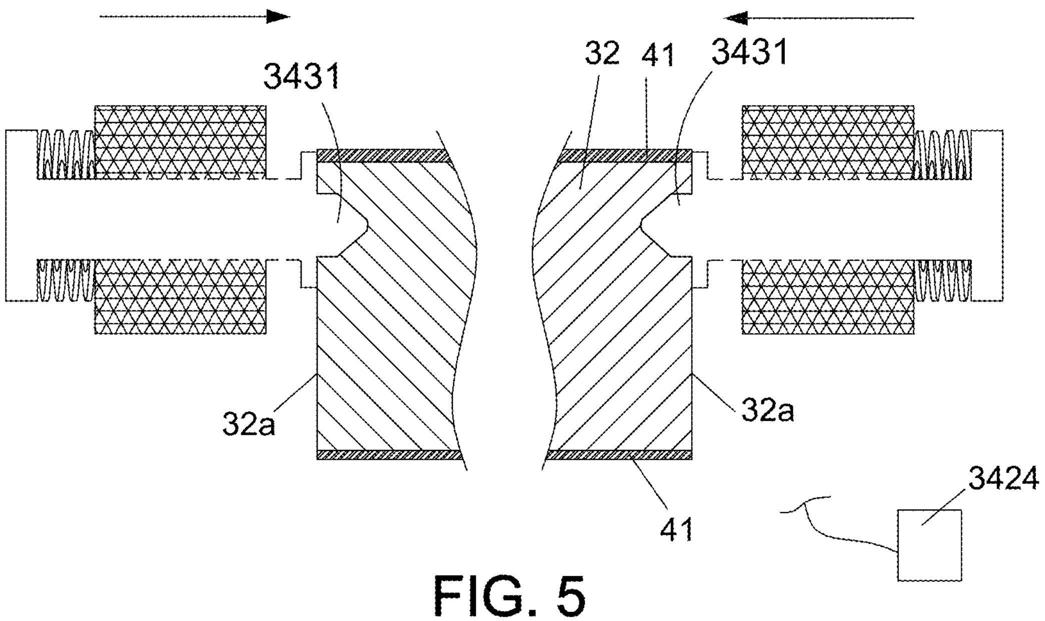
FIG. 5 is a partial front view of based on FIG. 4 to illustrate that the clamping portion is in a clamping state so that the gate panel is held by the two clamping portions.

The conveyor units 341 are driven by the driving assembly 342 to execute a conveying operation. The driving assembly 342 includes a rotatable mechanism. In the first preferred embodiment, the driving assembly 342 can include a transmission shaft 3421 disposed in the storage space S2, a plurality of transmission units 3422, at least one driving body 3423, and a driving unit 3424 (shown in FIG. 3 and FIG. 5). The driving unit 3424 serves to motivate the clamping assemblies 343 to stick out. The transmission shaft 3421 is rotated by the driving body 3423. The conveyor units 341 each surround the driving assembly 342 by putting each conveyor unit 341 around two end portions of the transmission shaft 3421 and also around the transmission members 3422. For example, FIG. 1 shows that one end of the conveyor unit 341 goes around an end portion of the transmission shaft 3421, and the other end of the conveyor unit 341 goes around the transmission unit 3422. It is possible that the end portion of the transmission shaft 3421 is provided with a toothed wheel around which the conveyor unit 341 is disposed. Accordingly, the rotation of the transmission shaft 3421 is actuated by operating the driving body 3423. Because of such rotation, the conveyor units 341 conduct the conveying operation for moving the gate panels 32. That is, the movement of the gate panels 32 synchronizes with the conveying operation. The driving body 3423 can be a motor or an electric device that provides power. It is possible to rotate the transmission shaft 3421 with a manual transmission configuration. Herein, take the motor as an example in the first preferred embodiment. Moreover, the transmission unit 3422 can be a transmission gear capable of being rotated when the conveyor unit 341 is in operation, and the rotation of the transmission units 3422 assists the conveyor units 341 in executing the conveying operation.

At least two clamping assemblies 343 (briefly shown) serve to clamp each gate panel 32 while bracing respective clamping portions 3431 against the gate panel 32, thus assisting the gate panel 32 in moving. The clamping assemblies 343 can be in close contact with two end sections 32*a* of each gate panel 32 at the same time for attaining a firm clamping effect. The clamping mode is not limited. For example, in the first preferred embodiment, the end sections 32*a* each form a recess shown in FIG. 1. Each clamping assembly 343 includes a clamping portion 3431. The clamping portion 3431 is capable of sticking out to executing an outward jutting operation, and the outward jutting operation is triggered according to the actions of the driving assembly 342. In this case, the clamping portion 3431 is defined as a protrusion that fits the recess formed into the end section 32*a* when the clamping portion 3431 sticks out. In addition, at least two track regions S3 are provided (briefly shown in FIG. 1 and FIG. 1*a*). Each track region S3 is formed in each channel 311 and also in the storage space S2, that is, in each passage S4 which is located in the storage space S2. Thus, each track region S3 can be extended from the storage space S2 to each channel 311. Each clamping assembly 343 is connected to one side of each conveyor unit 341. For example, the clamping assembly 343 is pivotally connected to the conveyor unit 341 or fixedly connected to the conveyor unit 341. When the clamping assembly 343 is connected to the conveyor unit 341, the clamping assembly 343 is situated at the track region S3 to allow the location of each clamping assembly 343 to be corresponding to the location of each track region S3 to prevent the deviation of the clamping assembly 343. Accordingly, the clamping assemblies 343 are carried by the conveyor units 341 and moved by executing the conveying operation of the conveyor units 341.

The outward jutting operation means that the clamping assembly 343 sticks out towards the storage space S2 or towards the accommodation space S1. The clamping assembly 343 can be, but not limited to, an electromagnetic actuator, a cylinder, etc. In the first preferred embodiment, the electromagnetic actuator is taken as an example and shown in FIG. 2 through FIG. 5, wherein the clamping assembly 343 can include a main body 3430 connected to one side of the conveyor unit 341 (briefly shown in FIG. 2 and FIG. 4), a coil unit 3432 disposed in the main body 3430, and the clamping portion 3431. The clamping portion 3431 is preferably made of metal and surrounded by the coil unit 3432. There can also be a spring unit 3433 connected to the clamping portion 3431 to assist the clamping portion 3431 in sticking out or retracting. The driving unit 3424 can be a power supply unit 3424 capable of supplying electricity or electrical energy to the clamping assembly 343 or be other energy-supplying unit. In the first preferred embodiment, for example, the power supply unit is defined as the driving unit 3424 capable of energizing the coil unit 3432, and the energization of the coil unit 3432 decides whether to stick out the clamping portion 3431. The spring unit 3433 includes a spring and other correlated elements for working along with clamping portion 3431, thus cooperating with the working state of the power supply unit 3424. For instance, the arrangement shown in FIG. 4 and FIG. 5 may be adopted. When the power supply unit 3424 supplies electricity to the clamping assembly 343, the coil unit 3432 is energized to create a magnetic field. The magnetic force caused by the magnetic field pushes the respective clamping portions 3431 forwards, and the spring is compressed. Thus, the clamping portions 3431 are allowed to stick out towards the gate panel 32. Finally, the clamping portions 3431 grip two end sections 32*a* of the gate panel 32 for providing the clamping force (shown in FIG. 5). By contrast, when the power supply unit 3424 does not supply electricity, the coil unit 3432 is not energized, that is, the coil unit 3432 is in the state of power outage. Without the magnetic field, the spring springs back because of elasticity, and the clamping portions 3431 each retract in a direction opposite to the gate panel 32, thereby releasing the gate panel 32 (shown in FIG. 4).

Figures 1, 2:
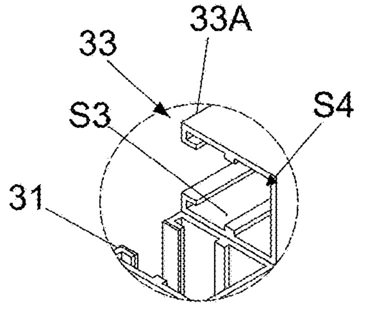
Figure 1A:
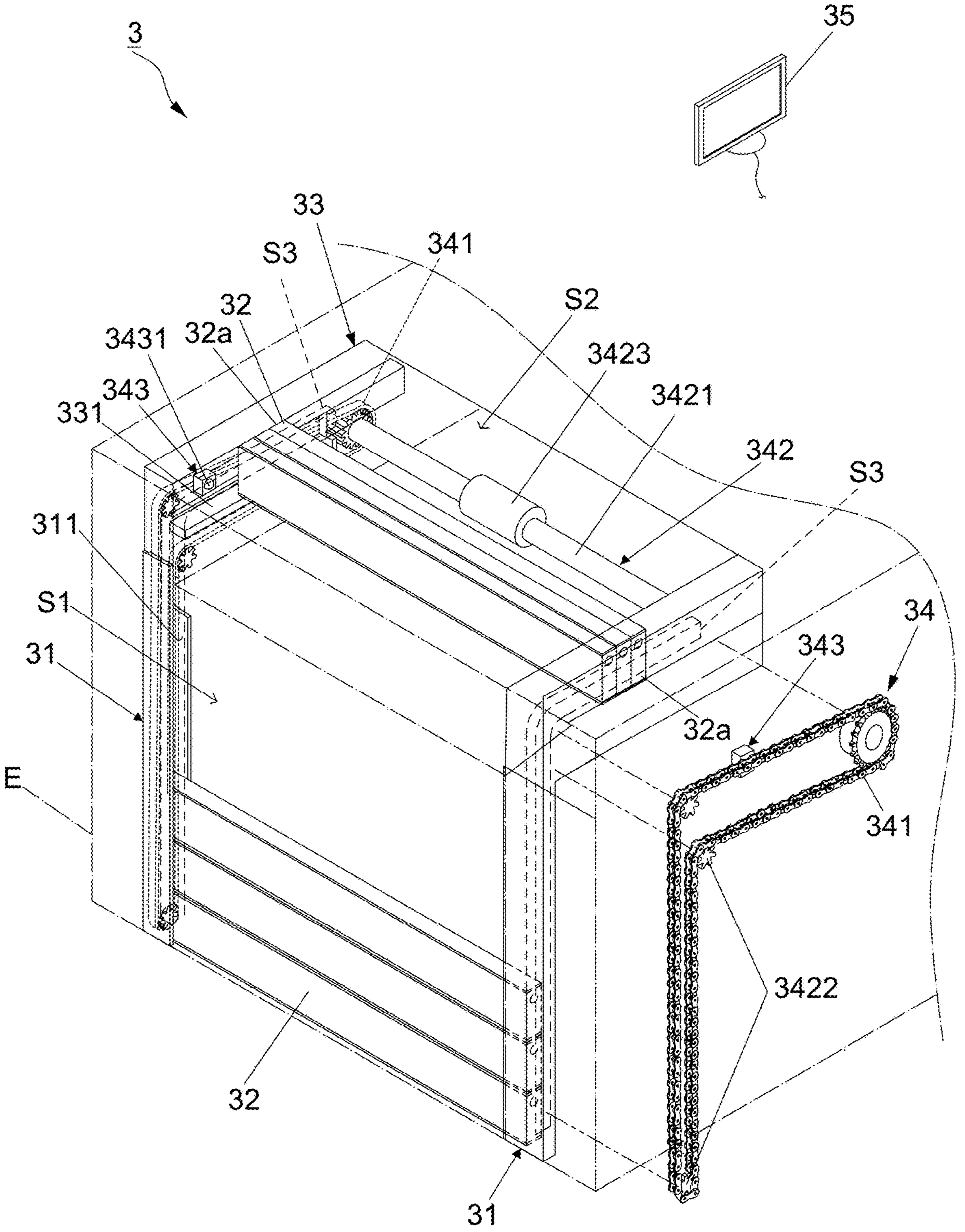
FIG. 1*a* is a perspective view showing a variant of the first preferred embodiment.
Figure 2:
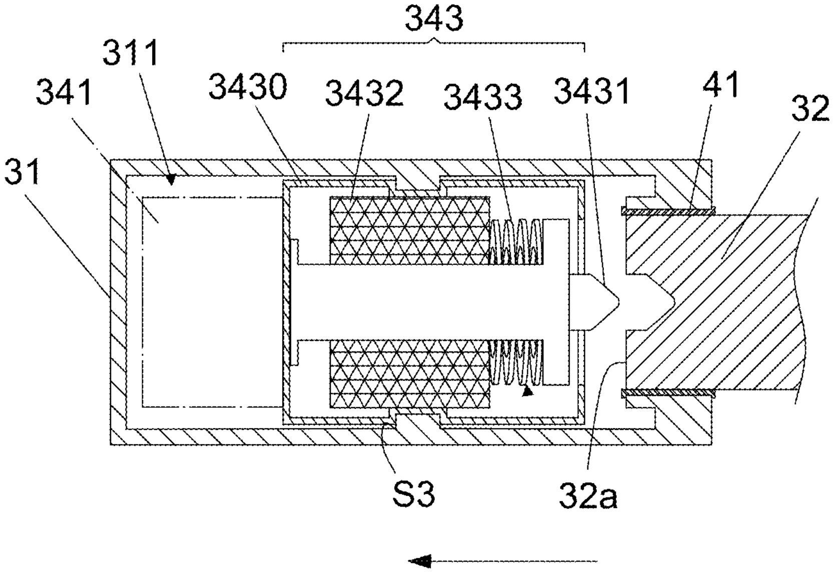
Figure 3:
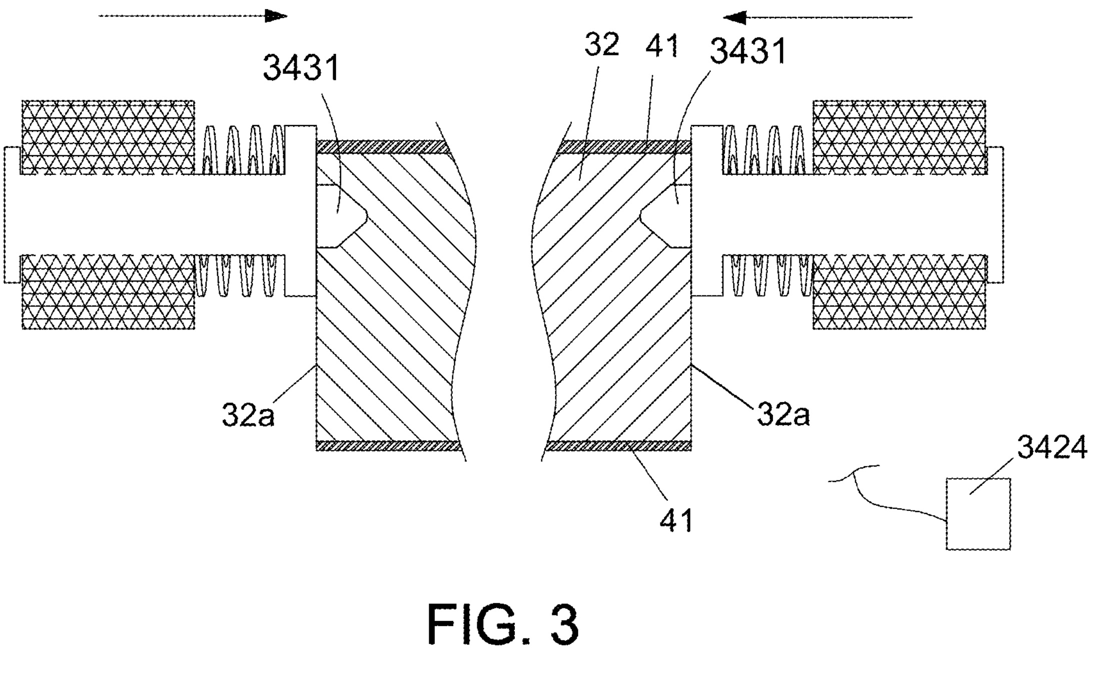
FIG. 3 is a partial front view of based on FIG. 2 and shows a cross section taken along B-B line of FIG. 1 to illustrate that the clamping portion is in a clamping state so that the gate panel is held by the two clamping portions.
Figure 4:
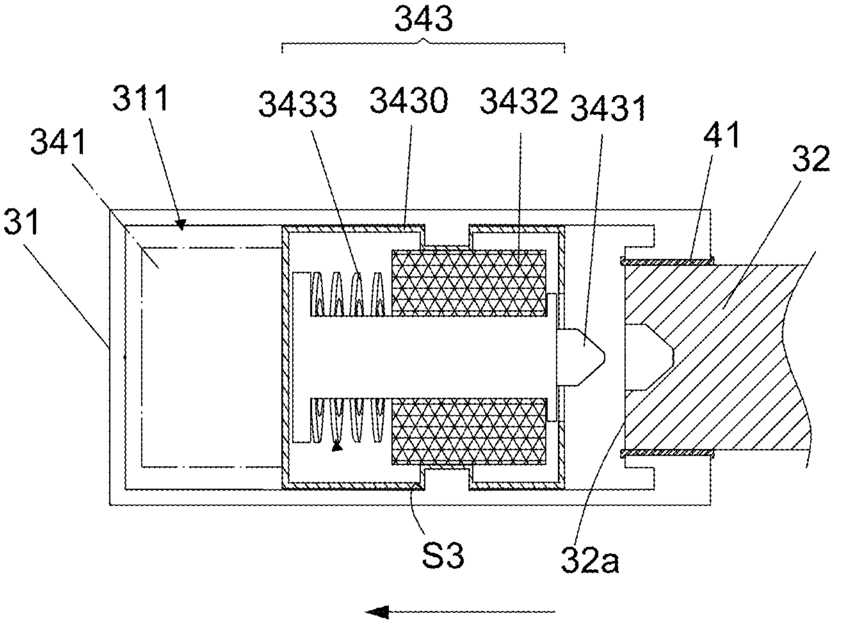
FIG. 4 is a top plan view showing a variant of FIG. 2 to illustrate that the clamping portion is in a non-clamping state whereby the clamping portion does not touch the gate panel.

Another arrangement shown in FIG. 2 and FIG. 3 may be adopted. When the power supply unit 3424 does not supply electricity, the coil unit 3432 is not energized. Without the magnetic field, the spring springs back because of elasticity, which causes the clamping portion 3431 to stick out towards the gate panel 32 for clamping the two end sections 32*a* of the gate panel 32 (shown in FIG. 3). By contrast, when the power supply unit 3424 supplies electricity to the clamping assembly 343, the coil unit 3432 is energized to create a magnetic field. The magnetic force of the magnetic field pushes the respective clamping portions 3431 backwards, and the spring is compressed. This motion causes the clamping portions 3431 to retract in a direction opposite to the gate panel 32, thereby releasing the gate panel 32 (shown in FIG. 2).

The operation of this invention is described with the aid of FIG. 1, FIG. 2, and FIG. 3. Firstly, the improved gate structure 3 is installed at an entrance and exit E of a building. The driving assembly 342 is usable in the situation of the need for the gate panels 32, such as emergency events, typhoons, heavy rains, and rainstorms. The driving assembly 342 is actuated by proper control means. For example, the driving assembly 342 starts to work when the control portion 35 is directly actuated by a user. The conveyor units 341 and the clamping assemblies 343 are actuated under the control of the driving assembly 342 to execute the process of clamping and conveying the gate panels 32, and the conveyance of the gate panels 32 involves a stacking mode and a storing mode.

The stacking mode functions to close the entrance and exit E, thereby shutting out water and preventing the water from entering the building. The stacking mode includes sticking out the clamping portions 3431 towards the storage space S2. When the clamping portions 3431 props against two end sections 32*a* of a gate panel 32 which is deemed to be a target gate panel, the target gate panel 32 is clamped by the clamping assemblies 343. Preferably, the upper regions of the end sections 32*a* are gripped by the clamping portions 3431 for attaining a firm clamping and holding effect and preventing the gate panel 32 from leaning to one side. As for example shown in FIG. 3, the recesses are each situated at the upper region of the end section 32*a*, and the clamping portions 3431 are fitly inserted into the recesses for clamping the end section 32*a* stably.

Then, the driving body 3423 is actuated to rotate the transmission shaft 3421. The conveyor units 341 function while rotating the transmission shaft 3421 and force the transmission units 3422 to rotate, thereby carrying out a conveying operation. Each movement of the clamping assemblies 343 is caused by executing the conveying operation of the conveyor units 341. During the conveying operation, the target gate panel 32 clamped by the clamping portions 3431 is moved from the storing portion 33 to the frame bodies 31, that is, conveyed from the storage space S2 to the accommodation space S1. When the gate panel 32 arrives at a target place inside the accommodation space S1, the action of the clamping portions 3431 is affected by the working state of the power supply unit 3424 so that the clamping portions 3431 retract in opposite directions, and thus the gate panel 32 is released and placed at the target place. After the gate panel 32 is placed at the target place, the clamping assemblies 343 whose clamping portions 3431 are in the retracted state are moved back to the storage space S2 because of the conveying operation of the conveyor units 341. When the clamping portions 3431 stick out again, the clamping assemblies 343 clamp another gate panel 32 which is deemed to be a new target gate panel and carry the new gate panel 32 to the accommodation space S1. Then, the new gate panel 32 is released and placed at a new target place inside the accommodation space S1. By repeating the conveyance of multiple gate panels 32, the gate panels 32 are piled on top of each other. In other words, the conveying operation stacks the gate panels 32 in sequence between the frame bodies 31, thereby attaining a multi-layered stacking effect.

When the last gate panel 32 arrives at the last target place, this gate panel is defined as a top gate panel 32. Meanwhile, the clamping assemblies 343 remains the clamping state by clamping the top gate panel 32, and the driving body 3423 adds additional drive force to force the top gate panel 32 to press downwards. The gate panels 32 in the multi-layered stacked state are in closer contact with each other under the downward pressure and with the aid of the strip units 41 to prevent any interstices formed between the gate panels 32. Thus, a dense and close stacking effect is preferably obtained to close the entrance and exit E closely, which shuts out water efficiently to avoid the invasion of heavy rain and wind.

The number of the stacked gate panels 32 can be controlled by the control portion 35 for providing a flexible use and attaining a more convenient use The storing mode functions to open the entrance and exit E, that is, to eliminate the closed state. Both of the storing mode and the stacking mode include adding the clamping force to each gate panel 32 with the clamping portions 3431 and moving the clamped gate panels 32 sequentially with the conveying operation of the conveyor units 341. The storing mode differs from the stacking mode in the conveyance route. The storing mode is executed to convey the clamped gate panel 32 from the frame bodies 31 to the storing portion 33. Specifically, the top gate panel 32 is clamped by the clamping assemblies 343 and then conveyed from the accommodation spaced S1 to the storage space S2. When this gate panel 32 reaches an entrance of the storing portion 33, the gate panel 32 is moved along the guidance seats 331 and keeps going deep into the storage space S2 with the aid of the support force of the guidance seats 331 and the clamping force of the clamping assemblies 343. When the gate panel 32 arrives at a target area in the storage space S2, the action of the clamping portions 3431 is affected by the working state of the power supply unit 3424 so that the clamping portions 3431 retract in opposite directions. Because of the retraction, the gate panel 32 is released and placed at the target area. After the gate panel 32 is placed at the target area, the clamping assemblies 343 whose clamping portions 3431 are in the retracted state are moved back to the accommodation space S1 because of the conveying operation of the conveyor units 341. When the clamping portions 3431 stick out again, the clamping assemblies 343 clamp another gate panel 32, carry the clamped gate panel 32 to the storage space S2, and place the gate panel 32 at a new target area next to the previous target area where the previous gate panel 32 is located. By repeating the conveyance of multiple gate panels 32, the gate panels 32 are stored in the storing portion 33 and arranged in order of movements. After storing the gate panels 32 in the storing portion 33, the entrance and exit E is open to communicate with an outside, and people and vehicles are allowed to go in and go out through the entrance and exit E.

On the basis of the above, the improved gate structure 3 is directly installed at the entrance and exit E of the building for ease of use. If the user is in need of gate panels 32, the stacking mode of the gate panels 32 can be instantly performed so that the entrance and exit E is closed to shut out the flow of water and prevent rain and wind from invading the interior of the building. In addition, the process of stacking the gate panels 32 is executed without moving and installing the gate panels 32 with physical labor, and such stacking mode is allowed to fight against threats from unexpected heavy rains immediately. Furthermore, the use of the improved gate structure 3 involves a series of working details, including the outward jutting operation and retracting operation of the clamping portions 3431 and the conveying operation of the conveyor units 341, thus allowing the gate panels 32 to be efficiently piled up in the accommodation space S1 or to be stored in the storage space S2 in a neat arrangement. Therefore, the gate panels 32 can be quickly moved downwards for attaining a stacking effect or quickly moved upwards for attaining a storing effect, thereby saving time and effort and improving the convenience of use. The gate panels 32 can also be stored without looking for additional ground areas, which renders the spatial usage more flexible.

Figure 6:
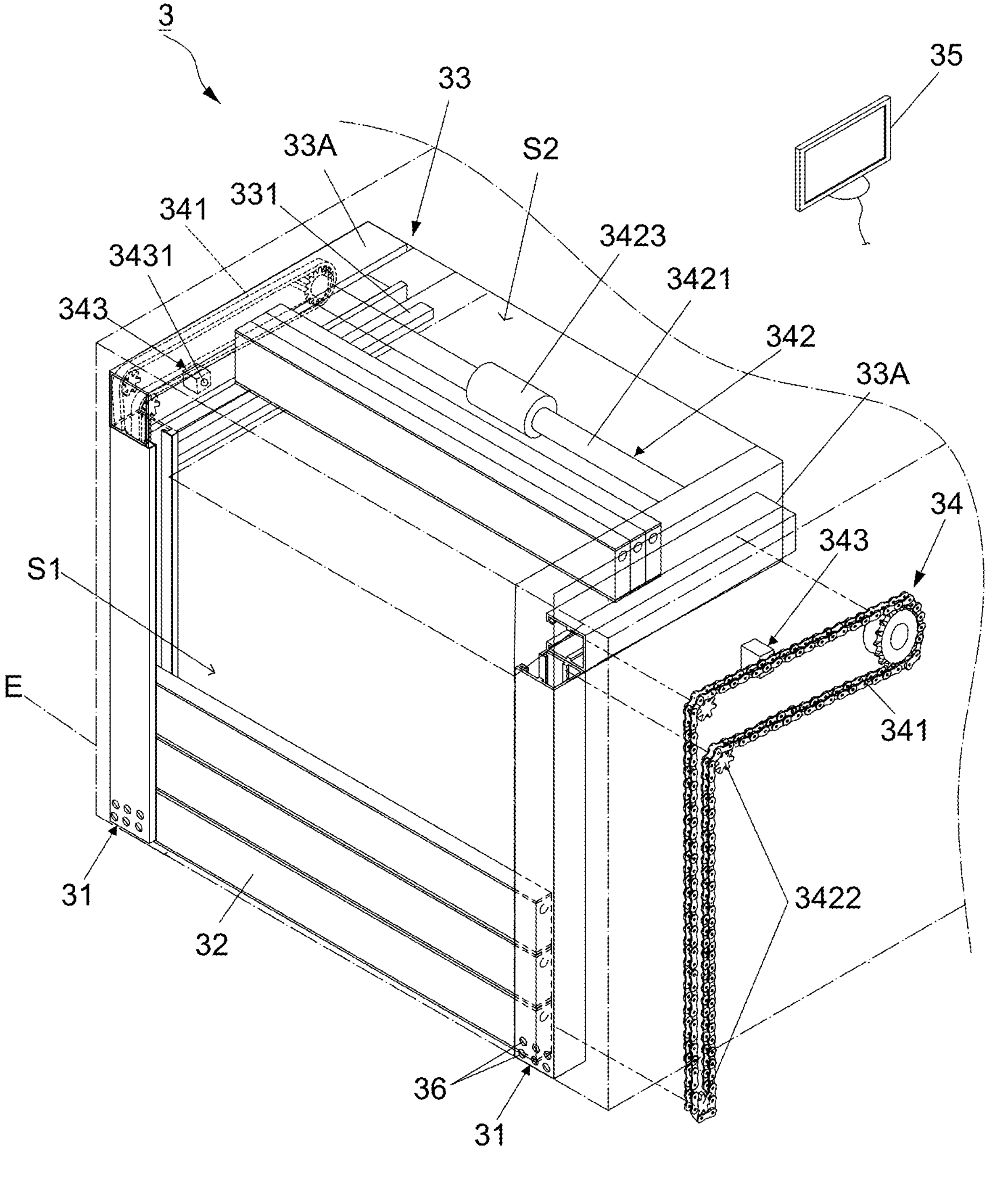
FIG. 6 is a perspective view showing a second preferred embodiment of this invention.

Referring to FIG. 6, a second preferred embodiment of the improved gate structure 3 includes the elements, the concatenation of correlated elements, and operations disclosed by the first preferred embodiment for the same objectives and purposes. The second preferred embodiment is characterized in that there can be a plurality of pores 36 formed on each frame body 31 for discharging water. Preferably, the pores 36 are merely formed through an outer surface of the frame body 31. The existence of the pores 36 offers added value to the improved gate structure 3 as the pores 36 help force water out of the frame bodies 31, thereby preventing the invasion of rain and wind and reducing the occurrence of floods.

Figure 7:
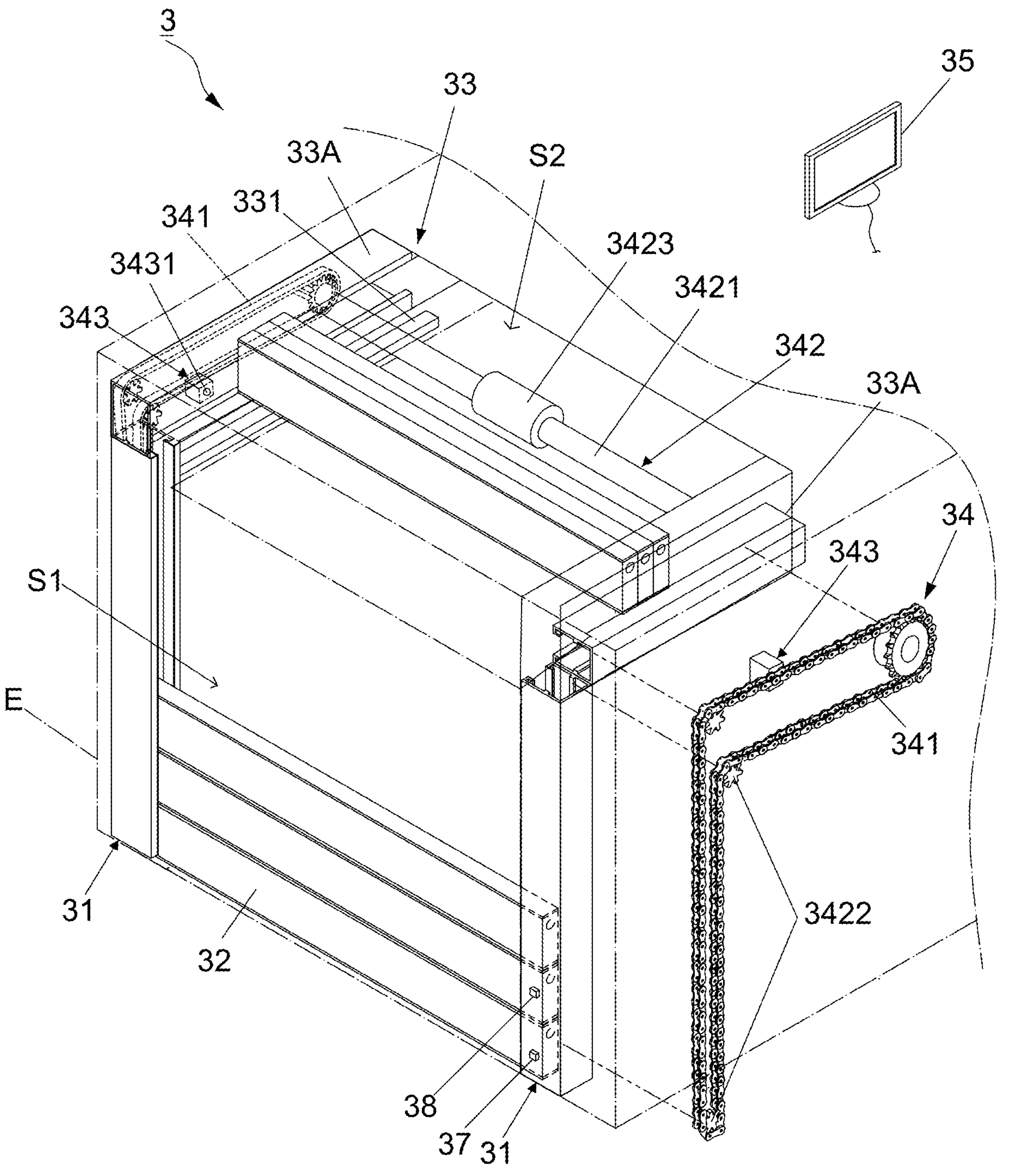
FIG. 7 is a perspective view showing a third preferred embodiment of this invention.

Referring to FIG. 7, a third preferred embodiment of the improved gate structure 3 includes the elements, the concatenation of correlated elements, and operations disclosed by the first preferred embodiment for the same objectives and purposes. The third preferred embodiment is characterized in that the driving assembly 342 is further connected to at least one sensor unit for offering added value to the improve gate structure 3. A detected result obtained by the sensor unit determines if the driving assembly 342 needs to work, thus deciding whether to move the gate panels 32. In particular, when the detected result is abnormal, the working state of the driving assembly 342 assists the gate panels 32 in moving or stops the movement of the gate panels 32. For example, at least one first sensor unit 37 can be disposed on any one of the frame bodies 31 and connected to the driving assembly 32. In this case, the first sensor unit 37 can be electrically connected to the driving body 3423 and the driving unit 3424. The first sensor unit 37 is adapted to detect a current water level and includes a processing system for processing, comparing, and analyzing the detected data. When the current water level detected by the first sensor unit 37 exceeds a reference value stored in the first sensor unit 37, the first sensor unit 37 transmits a command (i.e., a move signal) to the driving assembly 342 automatically. Because of the move signal, the driving assembly 342 cooperates with the clamping assemblies 343 and the conveyor units 341 to fulfill the clamping action and the moving action, thus conveying the gate panels 32 to the accommodation space S1 and stacking the gate panels 32 in sequence. Therefore, the entrance and exit E is closed to prevent the flooding or inundating problem caused by the too high water level. Therefore, the improved gate structure 3 is more convenient to use and attains a safer use.

It is also possible that at least one second sensor unit 38 is disposed on any one of the frame bodies 31 and connected to the driving assembly 342. In particular, the second sensor unit 38 can be electrically connected to the driving body 3423 and the driving unit 3424. The second sensor unit 38 is adapted to detect if any obstacle exists and includes a processing system for processing, comparing, and analyzing the detected data. When the second sensor unit 38 detects that any obstacle stays in the accommodation space S1, the second sensor unit 38 transmits a command (i.e., a stop signal) to the driving assembly 342 automatically. Because of the stop signal, the driving assembly 342 stops operating. The conveyor units 341 and the clamping assemblies 343 also stop moving, thus stopping the movement of the gate panels 32. This design prevents the gate panels 32 from hurting human beings, animals, and other objects, thereby allowing the improved gate structure 3 to be more convenient to use and attaining a safer use.

Figure 8:
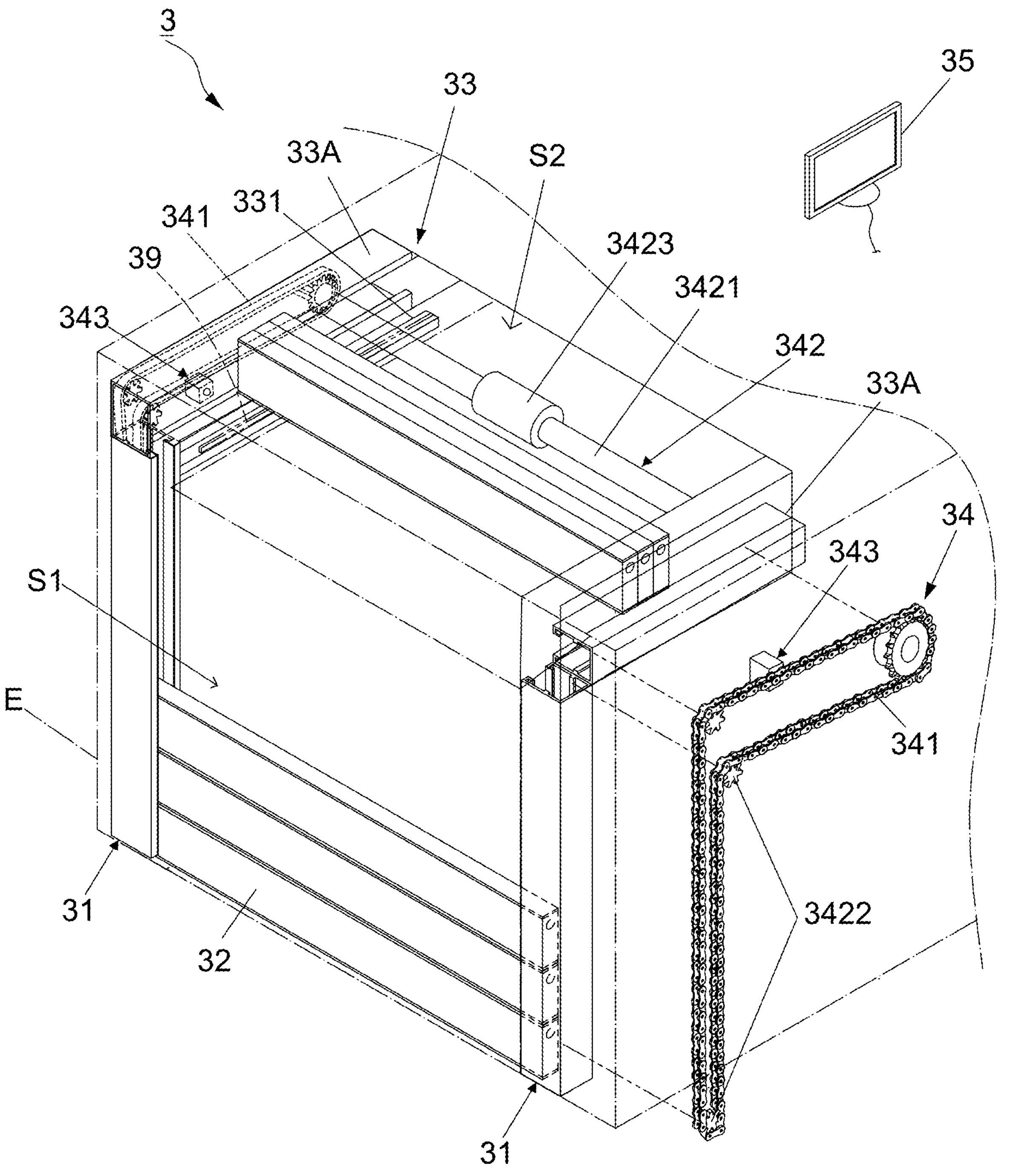
FIG. 8 is a perspective view showing a fourth preferred embodiment of this invention.

Referring to FIG. 8, a fourth preferred embodiment of the improved gate structure 3 includes the elements, the concatenation of correlated elements, and operations disclosed by the first preferred embodiment for the same objectives and purposes. The fourth preferred embodiment is characterized in that there can be at least one position-sensing unit 39 adapted to sense if the gate panels 32 are placed in position, thus offering added value to the improved gate structure 3. In the figure, one position-sensing unit 39 on one side is briefly illustrated for the sake of conciseness. Each position-sensing unit 39 can be installed in the storage space S2. For example, the positioning-sensing unit 39, as shown, is disposed on the guidance seat 331. The position-sensing unit 39 can be a position switch capable of determining if the gate panels 32 which enter the storing portion 33 are put and positioned in a neat arrangement within the storage space S2.

Figure 9:
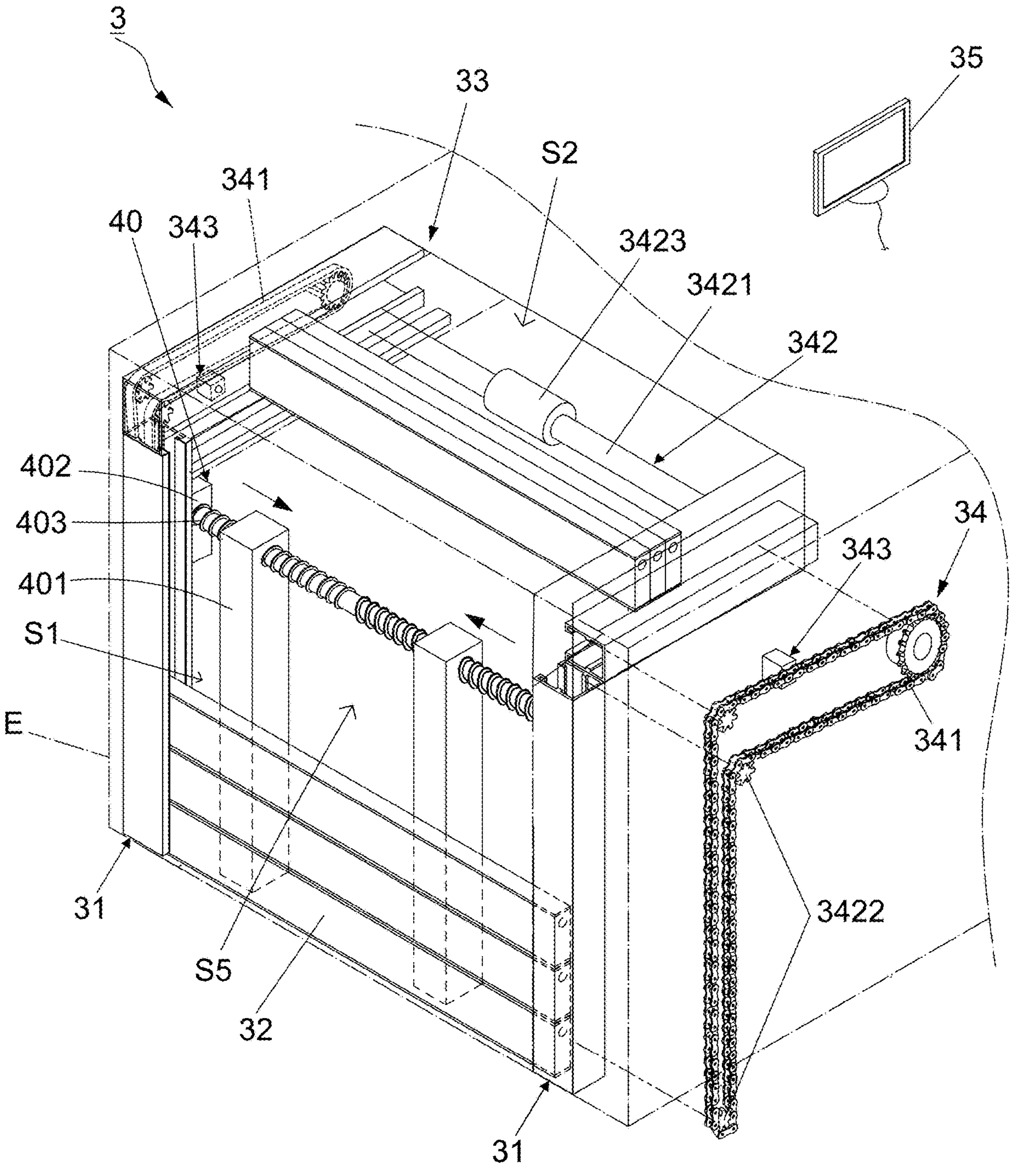
FIG. 9 is a perspective view showing a fifth preferred embodiment of this invention.

Referring to FIG. 9, a fifth preferred embodiment of the improved gate structure 3 includes the elements, the concatenation of correlated elements, and operations disclosed by the first preferred embodiment for the same objectives and purposes. The fifth preferred embodiment is characterized in that a support assembly 40 is disposed beside the frame bodies 31, and a working space S5 is defined next to the accommodation space S1. The support assembly 40 includes at least one supporting shaft 401. Herein take for example two supporting shafts 401 capable of moving within the working space S5. The movement of the supporting shaft 401 may be operated manually. Alternatively, the movement of the supporting shaft 401 may be operated with the help of mechanical control. For example, the support assembly 40 further includes a power source 402 beside the frame bodies 31 and a driving axle 403 driven by the power source 402. The power source 402 is a motor or other device. The supporting shaft 401 is movably disposed on the driving axle 403. Accordingly, the rotation of the driving axle 403 is actuated by operating the power source 402, and such rotation causes each supporting shaft 401 to move within the working space S5, as arrowed in FIG. 9. When the supporting shafts 401 each arrive at a target spot in the working space S5, the gate panels 32 which are already stacked in the accommodation space S1 are supported by each supporting shaft 401. With the support force of the support assembly 40, the stacking strength between the gate panels 32 is greatly enhanced to fight against the impact force of rain and wind and prevent the deformation of the gate panels 32 when the gate panels 32 are in the stacked state, thereby shutting out the water efficiently.

To sum up, the improved gate structure of this invention is directly installed at an entrance and exit of the building for ease of use. This invention also takes advantage of the cooperation between the clamping force provided by the clamping assemblies and the conveying operation executed by the conveyor units to move the gate panels to the accommodation space for attaining the stacking effect or to the storage space for attaining the storing effect. Accordingly, the gate panels are quickly and stably piled up or stored without using physical labor, thereby saving effort and time. The gate panels are stored without looking for additional ground space, which renders the usage of the space more flexible. Based on the improved gate structure, it is more convenient and easier to stack and store the gate panels.

While the embodiments are shown and described above, it is understood that further variants and modifications may be made without departing from the scope of this invention.

What is claimed is:

1. An improved gate structure configured to be installed at an entrance and exit of a building and comprising:

a plurality of gate panels;

at least two frame bodies disposed at said entrance and exit and spaced apart from each other so that an accommodation space is defined between said frame bodies, each of said frame bodies having a channel, each of said gate panels being put in said accommodation space when two end sections of each of said gate panels are inserted into respective channels of said frame bodies;

at least one driving portion configured to move said gate panels; and a storing portion installed at said entrance and exit;

wherein said storing portion is adjacent to said frame bodies, an interior of said storing portion defining a storage space and being extended in a first direction, said driving portion including a driving assembly, at least two clamping assemblies, and at least two conveyor units, each of said conveyor units being disposed in said storage space and said channel of each of said frame bodies, said conveyor units being each put around said driving assembly so that a conveying operation of said conveyor units is carried out by operating said driving assembly, at least two track regions being formed, with each of said track regions formed in said storage space and said channel, each of said clamping assemblies being connected to one side of each of said conveyor units when each of said clamping assemblies is situated at each of said track regions, each of said clamping assemblies including a clamping portion capable of sticking out to execute an outward jutting operation;

wherein the outward jutting operation of said clamping portion is triggered by said driving assembly so that respective clamping portions of said clamping assemblies clamp each of said gate panels after said respective clamping portions stick out, said clamping assemblies being moved when said driving assembly is in operation to execute the conveying operation of said conveyor units, thereby conveying each clamped gate panel from said storage space to said accommodation space or from said accommodation space to said storage space, the conveyance to said accommodation space allowing said gate panels to be sequentially stacked in said accommodation space for closing said entrance and exit, the conveyance to said storage space allowing said gate panels to be sequentially stored in said storage space for opening said entrance and exit.

2. The improved gate structure according to claim 1, wherein at least two spaced-apart frame bases are disposed in said storage space, each of said frame bases being adjacent to each of said frame bodies, each of said frame bases defining a passage adapted to accommodate each of said conveyor units, each of said track regions being formed in each said passage of each of said frame bases.

3. The improved gate structure according to claim 1, wherein said driving assembly includes at least one driving body, a rotatable transmission shaft disposed in said storage space, a plurality of transmission units, and a driving unit adapted to trigger the outward jutting operations of said respective clamping portions, said conveyor units being put around two end portions of said transmission shaft and around said transmission units, said transmission shaft being rotated by operating said driving body, the conveying operation of said conveyor units being conducted by the rotation of said transmission shaft.

4. The improved gate structure according to claim 2, wherein said driving assembly includes at least one driving body, a rotatable transmission shaft disposed in said storage space, a plurality of transmission units, and a driving unit adapted to trigger the outward jutting operations of said respective clamping portions, said conveyor units being put around two end portions of said transmission shaft and around said transmission units, said transmission shaft being rotated by operating said driving body, the conveying operation of said conveyor units being conducted by the rotation of said transmission shaft.

5. The improved gate structure according to claim 1, wherein each of said gate panels comes into contact with a plurality of strip units.

6. The improved gate structure according to claim 2, wherein each of said gate panels comes into contact with a plurality of strip units.

7. The improved gate structure according to claim 1, further comprising a control portion, said driving assembly being controlled by said control portion.

8. The improved gate structure according to claim 2, further comprising a control portion, said driving assembly being controlled by said control portion.

9. The improved gate structure according to claim 3, wherein each of said clamping assemblies includes a main body connected to one side of each of said conveyor units, a coil unit disposed in said main body, and a spring unit connected to said clamping portion, said clamping portion being made of metal and surrounded by said coil unit, a power supply unit being defined as said driving unit, said coil unit being energized when said power supply unit supplies electricity, said clamping portion being allowed to stick out or retract under the energization of said coil unit.

10. The improved gate structure according to claim 4, wherein each of said clamping assemblies includes a main body connected to one side of each of said conveyor units, a coil unit disposed in said main body, and a spring unit connected to said clamping portion, said clamping portion being made of metal and surrounded by said coil unit, a power supply unit being defined as said driving unit, said coil unit being energized when said power supply unit supplies electricity, said clamping portion being allowed to stick out or retract under the energization of said coil unit.

11. The improved gate structure according to claim 1, wherein a plurality of pores are formed on each of said frame bodies.

12. The improved gate structure according to claim 2, wherein a plurality of pores are formed on each of said frame bodies.

13. The improved gate structure according to claim 1, wherein said driving assembly is connected to at least one sensor unit, a detected result being obtained by said sensor unit to control said driving assembly, thus deciding whether said driving assembly triggers the movement of said gate panels or not.

14. The improved gate structure according to claim 2, wherein said driving assembly is connected to at least one sensor unit, a detected result being obtained by said sensor unit to control said driving assembly, thus deciding whether said driving assembly triggers the movement of said gate panels or not.

15. The improved gate structure according to claim 1, further comprising at least one position-sensing unit disposed in said storage space.

16. The improved gate structure according to claim 2, further comprising at least one position-sensing unit disposed in said storage space.

17. The improved gate structure according to claim 1, further comprising a support assembly disposed beside said frame bodies and a working space defined beside said accommodation space, said support assembly including at least one supporting shaft adapted to move within said working space, wherein in a state of stacking said gate panels in said accommodation space, said gate panels are supported by said supporting shaft when said supporting shaft arrives at a target spot in said working space.

18. The improved gate structure according to claim 2, further comprising a support assembly disposed beside said frame bodies and a working space defined beside said accommodation space, said support assembly including at least one supporting shaft adapted to move within said working space, wherein in a state of stacking said gate panels in said accommodation space, said gate panels are supported by said supporting shaft when said supporting shaft arrives at a target spot in said working space.

* * * * *